United States Patent [19]

Salemka

[11] Patent Number: 5,205,324
[45] Date of Patent: Apr. 27, 1993

[54] CLOSED CENTER VALVES

[75] Inventor: Robert M. Salemka, Portage, Mich.

[73] Assignee: Pneumo Abex Corporation, Hampton, N.H.

[21] Appl. No.: 794,025

[22] Filed: Nov. 19, 1991

[51] Int. Cl.$^5$ ............................................. F15B 13/044
[52] U.S. Cl. ..................................................... 137/627.5
[58] Field of Search ....................................... 137/627.5

[56] References Cited

U.S. PATENT DOCUMENTS

| | | | |
|---|---|---|---|
| 3,545,472 | 12/1970 | Franz | 137/627.5 X |
| 4,753,263 | 6/1988 | Warrick | 137/627.5 X |
| 4,840,193 | 6/1989 | Schiel | 137/627.5 |

Primary Examiner—Robert G. Nilson
Attorney, Agent, or Firm—Renner, Otto, Boisselle & Sklar

[57] ABSTRACT

Closed center valves include a first member movable toward and away from a vent opening in the valve for respectively closing and opening the vent opening, and a second member movable toward and away from the first member for respectively closing and opening a high pressure passage through the first member. A biasing force is applied to the first member for biasing the first member toward the vent opening. Different magnitudes of force may be applied to the second member to cause the second member to move toward the first member first to close the high pressure passage through the first member while the vent opening remains closed by the first member, and then to cause the first member to move away from the vent opening to open the vent opening while the high pressure passage in the first member remains closed by the second member. An armature will move the second member toward the first member with sufficient force to unseat the first member from the vent opening when rated current is applied to a solenoid coil surrounding the armature. A permanent magnet may be provided for moving the armature away from the second member when zero current is applied to the motor coil. Also, flat springs may be used to support the armature in coaxial alignment with the second member to prevent frictional contact between the armature and surrounding structure.

30 Claims, 3 Drawing Sheets

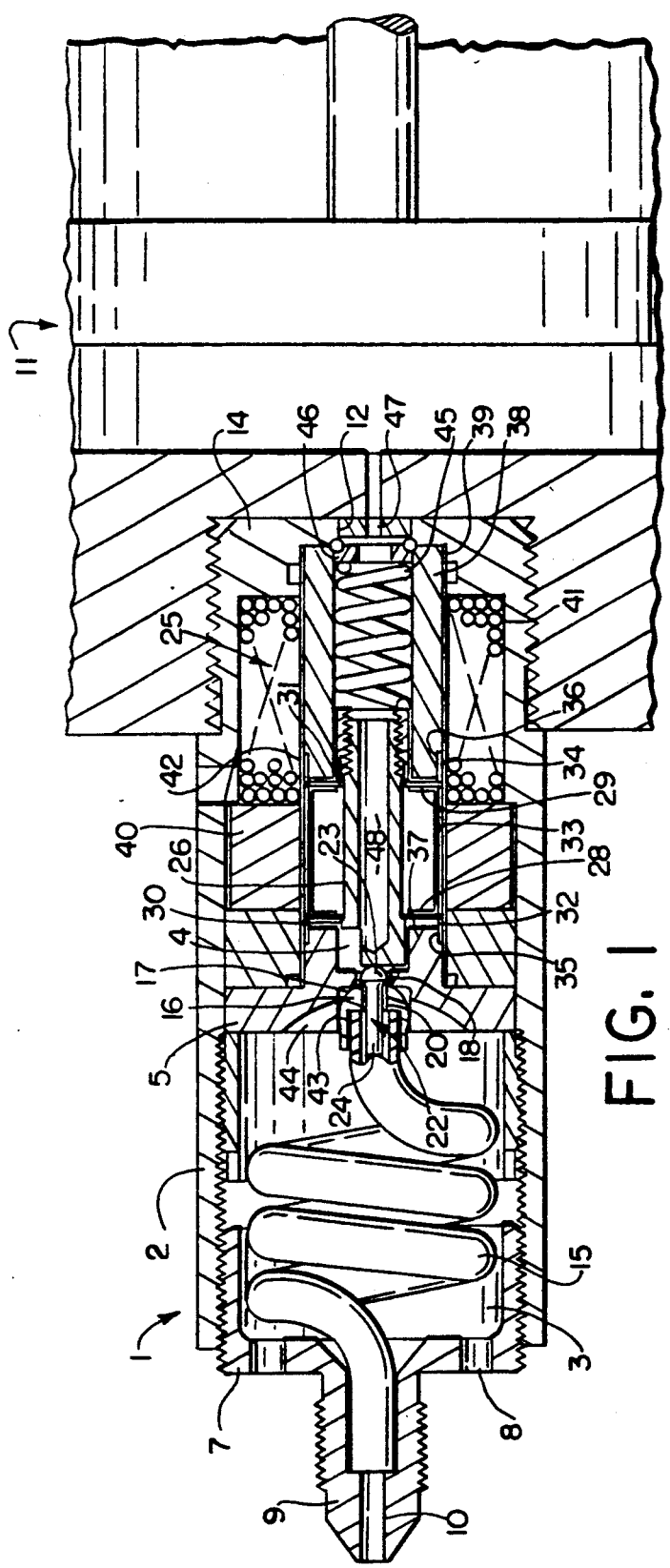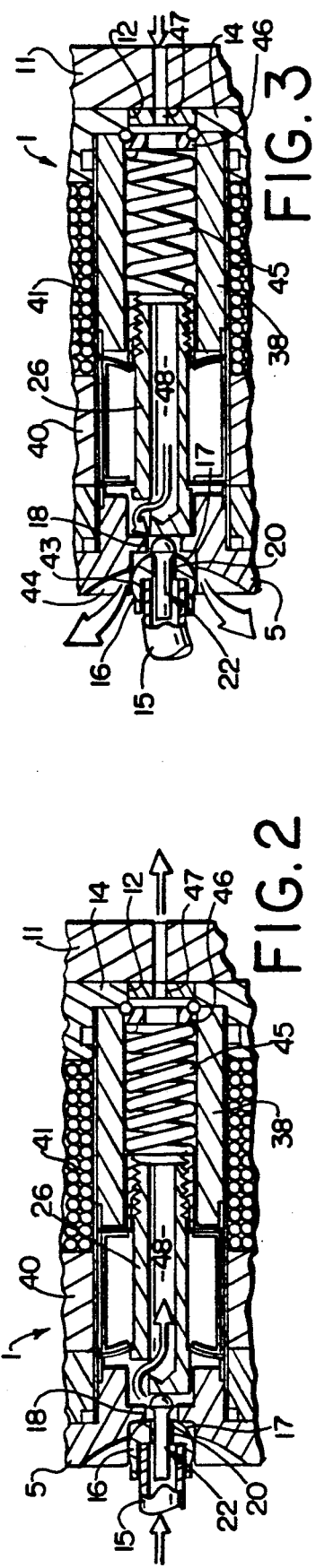
FIG. 1
FIG. 2
FIG. 3

CLOSED CENTER VALVES

FIELD OF THE INVENTION

This invention relates to closed center valves which are particularly suited to the pneumatic control of actuators in small missiles. However, such valves could be used in other applications as well.

BACKGROUND OF THE INVENTION

Present methods of pneumatically controlling the movements of actuators in small missiles have involved using either a single solenoid valve operating in an open center mode or a pair of solenoid valves operating in a closed center mode. The open center mode is typified by a constant gas flow that is either used to power the actuator or discarded overboard. The closed center mode, on the other hand, only uses the pressurized gas when motion of the actuator is required, thereby minimizing the amount of stored gas needed to operate the actuator or allowing a much longer run time. A major trade-off between these two methods is that a single solenoid valve operating in open center mode is less costly than a pair of solenoid valves operating in a closed center mode, but makes much less efficient usage of a fixed volume of stored high pressure gas that is used by both methods.

There is a need for a single valve that will operate as a closed center valve that is less costly than two simple two-way solenoid valves, and requires a less expensive electrical controller and less electrical power requirements to operate than a pair of solenoid valves. Also, there is a need for such a closed center valve that will operate in a closed center mode for example at frequencies above 30 cycles per second and at temperatures ranging from −65° F. to 450° F. Furthermore, there is a need for such a closed center valve that has a relatively long operational life and a storage life in excess of ten years.

SUMMARY OF THE INVENTION

The present invention relates to a closed center valve that includes a unique seating action for controlling both the filling and venting functions of the valve.

In accordance with one aspect of the invention, the valve utilizes the efficiency of a permanent magnetic field for generating the mechanical forces necessary to control valve movements with minimum electrical power requirements. Such a valve may be constructed so as not to require a reversal of current flow in the coils controlling the magnetic field, whereby only one power stage including a single electrical coil is needed for the electrical controller. The valve is mechanically and magnetically stable thus acting as an averaging device to high frequency modulation of the inlet voltage, whereby a very high frequency pulse modulation control may be used which reduces the physical size and cost of the electrical controller. Also, the dynamic response is no longer limited by the frequency of the pulse width modulation control which for proportionality of a bi-stable valve is in turn limited by the dynamic response of the valve. Furthermore, the use of a power Zener diode that is normally used to improve drop-out time for solenoids is no longer required. The cost of the electrical controller for driving such a valve is approximately one-half that required to drive a pair of solenoid valves.

In accordance with another aspect of the invention, the valve includes a moving armature that is suspended by a pair of flat springs which act to provide a net positive force versus displacement as well as frictionless bearings to eliminate rubbing contact which can cause wear and performance degradation, thus assuring long operational life.

In accordance with still another aspect of the invention, the inlet fluid to the valve may be brought in by means of a flexible tube, eliminating the need for a sliding seal, thus ensuring low leakage, long term storage and consistent performance over the operational life of the valve.

In accordance with yet another aspect of the invention, the valve acts as a pressure relief valve in extreme conditions such as the failure of an upstream pressure regulator thus eliminating the need for a pressure relief valve in the system.

In accordance with another aspect of the invention, the valve has an inherent low pressure feed-back, making it particularly advantageous for controlling loads where mass is a predominant feature.

In accordance with a further aspect of the invention, the valve is of a relatively low cost, simple design having relatively large dimensional tolerances of the component parts.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a longitudinal section through one form of closed center valve in accordance with this invention shown in the closed center position;

FIG. 2 is a fragmentary longitudinal section of a portion of the valve of FIG. 1 but showing the valve in the maximum fill position;

FIG. 3 is a fragmentary longitudinal section of a portion of the valve of FIG. 1 similar to FIG. 2 but showing the valve in the maximum vent position;

DETAILED DESCRIPTION OF THE PREFERRED EMBODIMENTS

Figure 4:
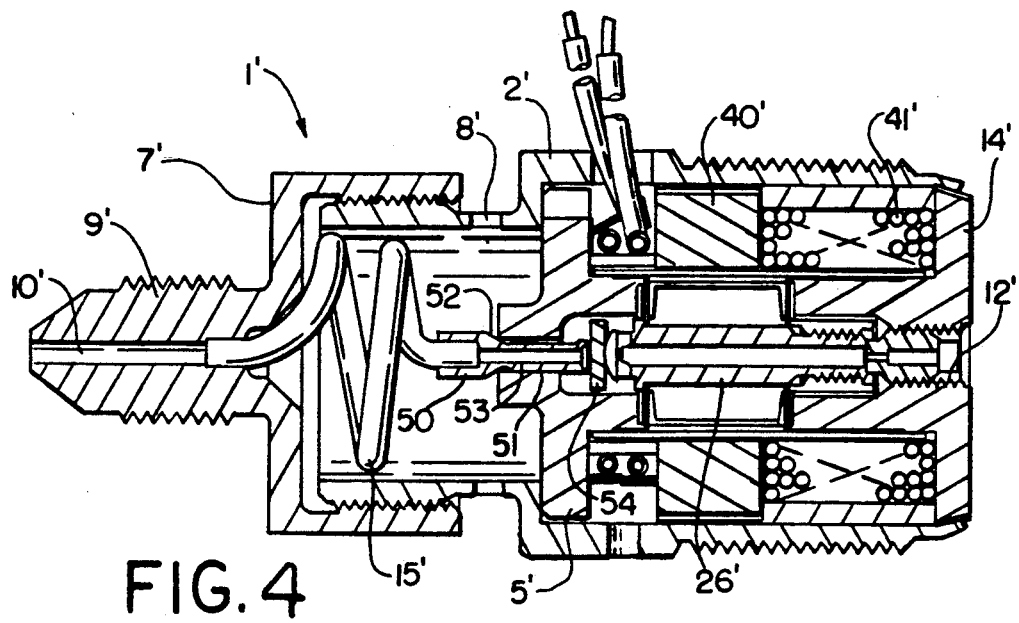
FIG. 4 is a longitudinal section through another form of closed center valve in accordance with this invention.

Referring now in detail to the drawings, and initially to FIG. 1, a preferred form of closed center valve in accordance with this invention is generally indicated by reference numeral 1 and includes an outer main housing 2 containing chambers 3 and 4 isolated from each other as by means of a cylindrical wall or partition 5 in fluid sealing engagement with the inner diameter of the housing 2. At the outer end of chamber 3 is an end cap 7 having vent openings 8 therein for venting the interior of chamber 3 to ambient.

Extending from the end cap 7 is a fitting 9 containing a high pressure inlet port 10 for connection to a fixed volume of stored high pressure fluid, preferably gas. Such high pressure fluid is selectively supplied to a fluid actuator 11 in fluid communication with chamber 4 through a port 12 in the housing end wall 14 for providing control pressure to the actuator and vented therefrom upon actuation of the control valve 1 as described hereafter.

High pressure fluid at inlet port 10 is ported through a coiled inlet tube 15 to a termination member 16 on the inner end of the tube. This eliminates the need for a sliding seal, thus ensuring low leakage, long term storage and consistent performance over the operational life of the valve. The coils of the tube 15 act as a spring providing a preload force urging a semi-spherical shape end portion 17 on the termination member 16 into contact with the adjacent end of a longitudinal hole 18 through the housing wall 5 to prevent control pressure within the fluid actuator 11 from being vented to ambient through the valve 1 as long as termination member 16 is in seated engagement with such hole.

Termination member 16 also has a longitudinal hole 20 therethrough in fluid communication with the inlet tube 15. The diameter of the hole 20 through termination member 16 is somewhat less than the diameter of the hole 18 through the housing wall 5, whereby a free-floating poppet valve 22 having a head portion 23 with a diameter greater than that of the hole 20 in the termination member 16 and less than that of the hole 18 in the housing wall 5 may be selectively moved into and out of engagement with the adjacent end of the hole 20 to respectively close and open such hole 20. The poppet valve 22 is maintained in the desired orientation relative to the termination member 16 by a reduced diameter stem portion 24 extending axially from the head portion 23 into the hole 20 in the termination member, and is trapped in the termination member 16 by the armature 26 of a motor armature 25 which controls the opening and closing movements of both the poppet valve 22 and termination member 16 as described hereafter.

Armature 26 is supported within the chamber 4 in coaxial alignment with the poppet valve 22 by a pair of radially extending flat springs 28, 29 which act to provide a net positive force versus displacement as well as frictionless bearings to prevent frictional contact between the armature 26 and surrounding structure, thus assuring long operational life of the valve 1. Springs 28, 29 engage oppositely inwardly facing shoulders 30, 31 on the armature 26 and are supported by a plurality of spacers 32, 33, 34 extending between stepped shoulders 35, 36 on an axial flange 37 protruding from the housing wall 5 into chamber 4 and a bushing 38 in coaxial alignment therewith. The bushing 38 is in turn supported within the chamber 4 by having its other end extending into a counterbore 39 in the housing end wall 14.

The forces necessary to move the armature 26 are generated by a toroidal shaped permanent magnet 40 and solenoid coil 41 which are supported radially outwardly of the armature by a sleeve 42 surrounding the housing wall flange 37 and bushing 38. Permanent magnet 40 is oriented with respect to the armature 26 to provide a magnetic flux path which is divided between the pole faces on either end of the armature but is biased to move the armature to the right of the null or closed center position of the valve 1 shown in FIG. 1 to the maximum fill position shown in FIG. 2 in which the poppet valve 22 is moved off its seat at one end of hole 20 when zero current is supplied to the solenoid coil 41, and to move the armature 26 to the left of the null or closed center position shown in FIG. 1 to the maximum vent position shown in FIG. 3 in which the poppet valve 22 is moved against its seat and the spherical shaped end portion 17 of the termination member 16 is moved off its seat at one end of hole 18 when rated current is supplied to the solenoid coil. Such a permanent magnet yields relatively higher armature forces for relatively low electrical power requirements.

When the valve 1 is in the maximum fill position shown in FIG. 2 at zero current, the high pressure gas within the coiled inlet tube 15 and termination member 16 will be supplied to the actuator 11 through the now unblocked hole 20 in the termination member, aligned hole 18 in the housing wall 5, a central passage 48 in the armature 26, and port 12 in the end wall 14.

To move the armature 26 in the opposite direction, current is supplied to the armature coil 41. As the current to the coil 41 is increased, the armature 26 moves toward the poppet valve 22. When the current is sufficient to cause the armature to force the poppet valve against its seat as shown in FIG. 1, the valve 1 is in its closed center position with both the inlet and vent holes 20 and 18 closed.

As the current is increased to rated current, the motor force tending to move the armature 26 in the direction of the poppet valve 22 continues to increase until the force exceeds the preload of the coiled inlet tube 15 acting on the termination member 16 and the termination member moves away from its seat at one end of hole 18, allowing the control pressure in the actuator 11 to vent through the port 12 in end wall 14, central passage 48 in armature 26, hole 18 in the housing wall 5, and vent passages 8 in the end cap 7 (see FIG. 1). The termination member 16 is guided in its movements by locating the termination member in a cylindrical counterbore 43 in the housing wall 5. Also, a plurality of radial slots 44 may be provided in the wall of the counterbore 43 to permit unrestricted venting of gas through the valve 1 when the termination member is moved off its seat as shown in FIG. 3.

A small trim spring 45 may be disposed between the right end of the armature 26 and a spring retainer 46 within the bushing 38 as shown in FIGS. 1-3 to provide a counterbalance force acting on the armature if needed. Also, a relatively small orifice 47 is desirably provided in the valve port 12 to control the maximum flow through the valve 1 to and from the actuator 11 and to increase the width of the modulation region of current which in turn decreases the relative effects of the current to overcome the force deadband between the fill and vent conditions of the valve.

From the foregoing, it will be apparent that the current is never reversed in the solenoid coil 41 during movement of the valve 1 between the closed center position shown in FIG. 1 and the maximum fill and vent positions shown in FIGS. 2 and 3, respectively, whereby only a single electrical coil and only one power stage for the electrical controller is required. The cost of the electrical controller for driving such a valve is approximately one-half that required to drive a pair of solenoid valves. Moreover, such a valve is mechanically and magnetically stable thus acting as an averaging device to high frequency modulation of the inlet voltage, whereby a very high frequency pulse modulation control may be used which reduces the physical size and cost of the electrical controller. Also, the dynamic response is no longer limited by the frequency of the pulse width modulation control which for proportionality of a bi-stable valve is in turn limited by the dynamic response of the valve. Furthermore, the use of a power Zener diode that is normally used to improve drop-out time for solenoids is no longer required.

Such a valve also acts as a pressure relief valve in extreme conditions such as the failure of an upstream pressure regulator, thus eliminating the need for a pressure relief valve in the system. Moreover, the valve has an inherent low pressure feed-back, making it particularly advantageous for controlling loads where mass is a predominant feature.

FIG. 4 shows a modified form of closed center valve 1' in accordance with this invention which is quite similar in construction and operation to that shown in FIGS. 1-3. Accordingly, the same reference numerals followed by a prime symbol are used to designate like parts. However, the valve 1' shown in FIG. 4 differs from that shown in FIGS. 1-3 in the use of a single loose fitting sliding element 50 in place of the termination member 16 and poppet valve 22 of the FIGS. 1-3 embodiment. The sliding element 50 is slidably received in a longitudinal bore 51 extending through the housing wall 5' and has a frustoconical surface 52 that is biased into engagement with the outer end of the bore 51 by the spring force of the coiled inlet tube 15'. A longitudinal hole 53 through the sliding element 50 may be selectively closed or opened by movement of the adjacent end of the armature 26' or a valve closure plate 54 interposed therebetween into and out of engagement with the adjacent end of the sliding element 50. When zero current is supplied to the solenoid coil 41', the permanent magnet 40' is biased to move the valve 1' to the maximum fill position shown in FIG. 4 with the sliding element 50 in seated engagement with the outer end of the longitudinal bore 51 through the housing wall 5' and the armature 26' and valve closure plate 54 moved out of engagement with the inner end of the sliding element.

To move the valve 1' to the maximum vent position, current is supplied to the solenoid coil 41'. As the current in the coil is increased, the armature 26' and valve closure plate 54 are moved toward the sliding element 50. When the armature 26' forces the valve closure plate 54 against the inner end of the sliding element 50, the valve 1' is in its closed center position with both the inlet and vent holes 53 and 51 closed. As the current is increased to rated current, the motor force proportionally increases until it exceeds the preload of the coiled inlet tube 15' acting on the sliding element 50 and moves the sliding element away from its seat allowing the control pressure in the fluid actuator to be vented out through the bore 51 and associated vent passages 8'. The closed center valve 1' shown in FIG. 4 has the advantage of a lower threshold around null, but has the disadvantage of a sliding part (i.e. sliding element 50).

Figure 5:
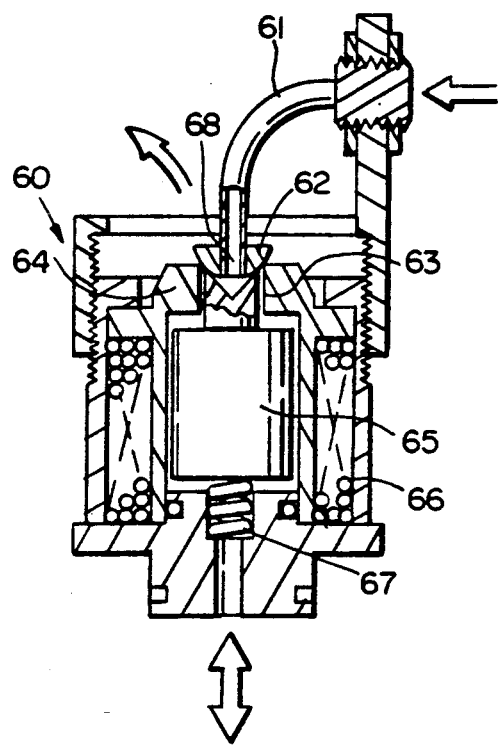
FIGS. 5–10 are schematic illustrations showing additional alternative valve configurations in accordance with this invention.

FIG. 5 is a schematic illustration of still another form of closed center valve 60 in accordance with this invention which, like the valve embodiments previously described, includes a flexible tube 61 having one end connected to a fixed volume of high pressure fluid, preferably gas, and a termination member 62 on the other end which is urged by the flexible tube into seated engagement with a vent hole 63 in the housing wall 64. However, in this embodiment, unlike the two embodiments previously described, there are no permanent magnets to bias the armature 65 to the maximum fill position at zero current. Accordingly, the solenoid coil 66 must be energized in one direction to cause the armature 65 to move to the maximum fill position out of engagement with the termination member 62, and energized in the reverse direction to cause the armature 65 to move in the opposite direction to the maximum vent position in which the armature is moved in the direction of the termination member 62 with sufficient force to move the termination member out of seating engagement with the vent hole 63. When the solenoid coil 66 is de-energized, either the actuator pressure within the valve, or if necessary, a light trim spring 67 acting on the bottom of the armature 65 will maintain the armature in the closed center position in which both the inlet and vent holes 68 and 63 are closed as shown in FIG. 5.

Figure 6:
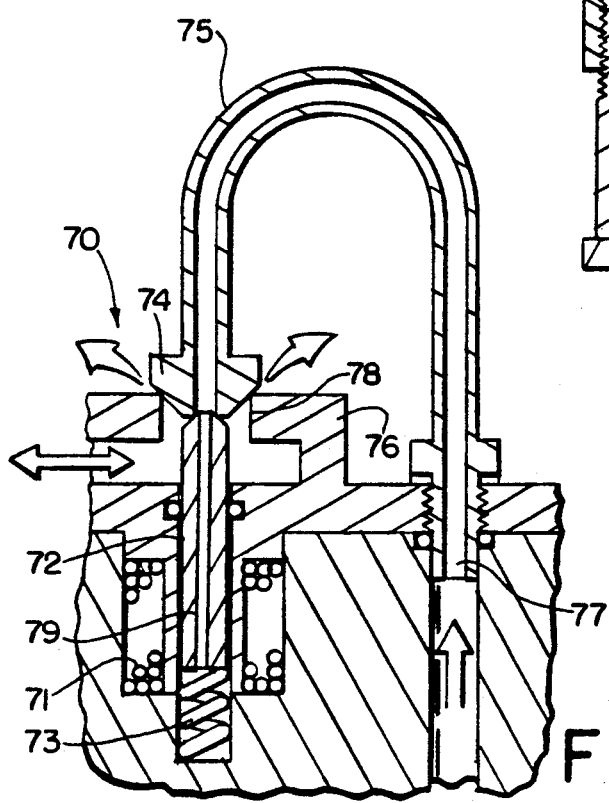

FIG. 6 is a schematic illustration of still another form of closed center valve 70 in accordance with this invention which also requires a reversal in the current to the solenoid coil 71 in order to cause the armature 72 to move between the respective fill and vent positions. Also, a light trim spring 73 may be provided to maintain the valve 70 in the closed center position shown in FIG. 6 with the armature 72 in seated engagement with the termination member 74 on the inner end of the flexible tube 75 and the termination member 74 in seated engagement with the vent port 78 in the valve housing 76 when zero current is applied to the solenoid coil. However, the trim spring 73 will not be required for normal operation if the high pressure fluid at the inlet port 77 is allowed to pass through a central passage 79 in the armature to provide a slight pressure unbalance on the armature urging the armature to the closed center position depicted in FIG. 6 when zero current is applied to the solenoid coil. Since the armature 72 is almost balanced with respect to pressure, it will operate through a wide range of pressures and requires relatively small forces for actuation, whereby the electrical power required to operate the valve 70 is correspondingly low.

Figure 7:
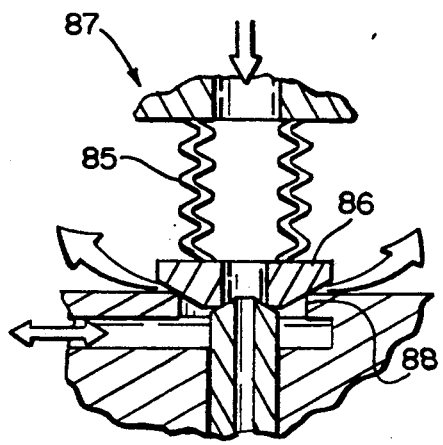
Figure 8:
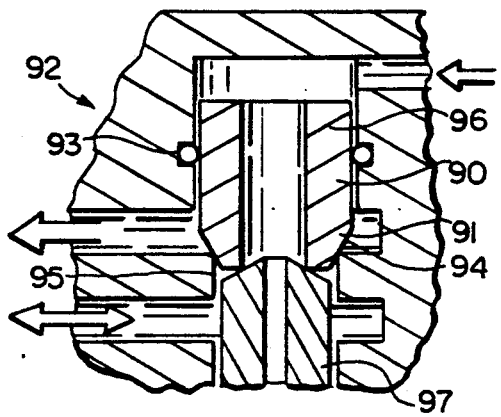

If desired, a low rate bellows 85 may be used in place of the flexible tube previously described to maintain a preload force urging the termination member 86 of the valve 87 into seated engagement with the valve vent hole 88, as schematically shown in FIG. 7. Alternatively, an actuator piston 90 may be used to maintain a preload force on the termination member 91 of valve 92 as schematically shown in FIG. 8. The piston 90 illustrated in FIG. 8 is surrounded by a pressure seal 93 and is slightly pressure unbalanced in a direction urging a conical end portion 94 on the termination member into sealing engagement with the vent hole 95. Also, a pressure hole 96 through the center of the piston 90 is closed and opened by movement of the armature 97 into and out of engagement therewith.

Figure 9:
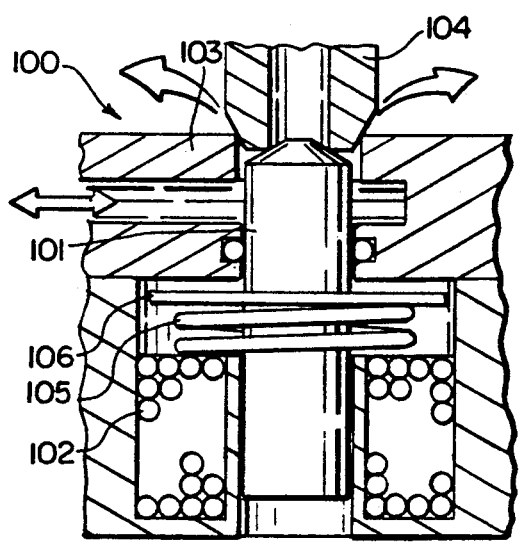

FIG. 9 shows still another form of closed center valve 100 in accordance with this invention in which a solid armature 101 is used to allow the solenoid coils 102 to be mounted outside the pressurized area 103. In this embodiment the armature 101 is totally pressure unbalanced in a direction urging the armature away from the high pressure supply member 104. Accordingly, a heavier bias spring-washer 105, 106 must be provided for maintaining the valve 100 in the closed center position shown in FIG. 9 when the solenoid coils 102 are deenergized.

Figure 10:
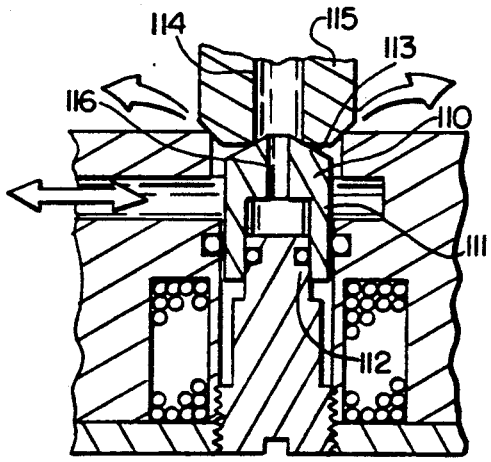

If desired, the pressure unbalanced armature/plunger 101 shown in FIG. 9 could be replaced by a semi-pressure balanced armature 110 as schematically shown in FIG. 10. In this embodiment, the armature 110 includes a cylindrical sleeve portion 111 in sliding sealed engagement with a non-magnetic core 112, and a conical end portion 113 movable into and out of sealed engagement with a high pressure passage 114 through the termination member 115. A central passage 116 through the conical end portion 113 allows high pressure fluid to act on an internal surface area of the armature 110 radially inwardly of the cylindrical sleeve portion 111.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A closed center valve comprising a housing containing first opening means for venting fluid through said valve, a first member movable toward and away from said first opening means for respectively closing and opening said first opening means, means for biasing said first member toward said first opening means, second opening means through said first member for directing high pressure fluid through said valve, and a second member movable away from said first member to open said second opening means while said first opening means remains closed by said first member, said second member also being movable toward said first member to close said second opening means while said first opening means remains closed by said first member, and being further movable toward said first member to cause said first member to move away from said first opening means to open said first opening means while said second opening means remains closed by said second member.

2. The valve of claim 1 further comprising motor armature means for causing said second member to move toward said first member.

3. The valve of claim 2 wherein said motor armature means comprises an armature in coaxial alignment with said second member, and coil means surrounding said armature for causing said armature to move toward said second member when current is supplied to said coil means.

4. The valve of claim 3 wherein as the current to said coil means is increased from zero current to rated current, sufficient force is applied to said armature first to cause said second member to close said second opening means while said first opening means remains closed by said first member, and then to cause said first member to move away from said first opening means to open said first opening means while said second opening means remains closed by said second member.

5. The valve of claim 3 further comprising permanent magnet means for causing said armature to move away from said second member when zero current is applied to said coil means.

6. The valve of claim 3 wherein said coil means causes said armature to move away from said second member when the current through said coil means is reversed.

7. The valve of claim 3 further comprising flat spring means for supporting said armature in coaxial alignment with said second member to prevent frictional contact between said armature and surrounding structure.

8. The valve of claim 1 wherein said means for biasing comprises a coiled inlet tube having a free end to which said first member is connected, said coiled inlet tube being adapted to supply high pressure fluid to said second opening means in said first member.

9. The valve of claim 1 wherein said means for biasing comprises a low rate bellows for applying a preload force to said first member urging said first member toward said first opening means.

10. The valve of claim 9 wherein said bellows contains a passage through which high pressure fluid is supplied to said second opening means in said first member.

11. The valve of claim 1 wherein said means for biasing comprises an actuator piston through which high pressure fluid is supplied to said second opening means in said first member, said actuator piston being pressure unbalanced in a direction urging said first member toward said first opening means.

12. The valve of claim 3 further comprising spring means for providing a preload force on said armature in a direction causing said second member to close said second opening means while said first opening means remains closed by said first member when zero current is applied to said coil means.

13. The valve of claim 12 wherein said armature is solid, and said coil means is mounted outside the pressurized area within said valve.

14. The valve of claim 3 wherein said armature is pressure unbalanced in a direction causing said armature to move said second member toward said first member to close said second opening means while said first opening means remains closed by said first member when zero current is applied to said coil means.

15. The valve of claim 3 wherein said armature has a passage therethrough communicating with the high pressure fluid in said second opening means when said second openings means is closed by said second member, said armature being pressure unbalanced in a direction causing said armature to move said second member toward said first member to close said second opening means while said first opening means remains closed by said first member when zero current is applied to said coil means.

16. The valve of claim 3 wherein said second member is integral with said armature.

17. The valve of claim 3 wherein said armature includes a non-magnetic core and a cylindrical sleeve in sliding sealed engagement with said non-magnetic core, said sleeve having a passageway communicating with the high fluid pressure in said second opening means.

18. The valve of claim 3 wherein said second member comprises poppet valve means interposed between said first member and said armature.

19. The valve of claim 18 wherein said poppet valve means includes a head portion movable into and out of engagement with said second opening means in said first member for respectively closing and opening said second opening means.

20. The valve of claim 19 wherein said poppet valve means includes a stem portion extending into said second opening means in said first member for orienting said poppet valve means, said stem portion being trapped in said second opening means by said armature.

21. The valve of claim 1 wherein said first member is slidably received in said first opening means, said first member having a conical surface movable into and out of sealed engagement with said first opening means.

22. The valve of claim 21 wherein said second member comprises a closure plate interposed between said first member and said armature.

23. A closed center valve comprising vent means for venting fluid through said valve, first means movable toward and away from said vent means for respectively closing and opening said vent means, means for biasing said first means toward said vent means, means for supplying high pressure fluid to said first means, and second means movable away from said first means to allow high pressure fluid to flow through said first means while said first means is biased to close said vent means, said second means also being movable toward said first means to block fluid flow through said first means while said first means is biased to close said vent means, and being further movable toward said first means to open said vent means while still blocking fluid flow through said first means.

24. The valve of claim 23 wherein said first means has a high pressure fluid passage therethrough, and said second means includes means for respectively opening and closing said passage through said first means, said valve further comprising an armature in coaxial alignment with said second means, and coil means surrounding said armature, said coil means being adapted to cause said armature to move said second means toward said first means to close said passage through said first means and cause said first means to move away from said vent means to open said vent means when rated current is applied to said coil means.

25. The valve of claim 24 further comprising means for biasing said armature in a direction causing said second means to close said passage through said first means while said vent means remains closed by said first means when zero current is applied to said coil means.

26. The valve of claim 24 further comprising permanent magnet means for causing said second means to move away from said first means to open said passage through said first means while said vent means remains closed by said first means when zero current is applied to said coil means.

27. The valve of claim 24 further comprising flat spring means for supporting said armature in coaxial alignment with said second means to prevent frictional contact between said armature and surrounding structure.

28. The valve of claim 24 wherein said second means is integral with said armature.

29. The valve of claim 23 wherein said means for biasing comprises a coiled inlet tube to which said first means is connected.

30. The valve of claim 29 wherein said means for supplying high pressure fluid to said first means comprises said coiled inlet tube.

* * * * *